(12) United States Patent
Banerjee (10) Patent No.: US 10,810,065 B1
(45) Date of Patent: Oct. 20, 2020

(54) APPLICATION PROGRAMMING INTERFACE (API) PLATFORM

(71) Applicant: SAP SE, Walldorf (DE)

(72) Inventor: Debashis Banerjee, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/429,734

(22) Filed: Jun. 3, 2019

(51) Int. Cl.
*G06F 13/00* (2006.01)
*G06F 9/44* (2018.01)
*G06F 9/46* (2006.01)
*G06F 3/00* (2006.01)
*G06F 9/54* (2006.01)

(52) U.S. Cl.
CPC .................... *G06F 9/546* (2013.01)

(58) Field of Classification Search
CPC ....................................... G06F 9/546
USPC ........................................................ 719/313
See application file for complete search history.

(56) References Cited

U.S. PATENT DOCUMENTS

2008/0134156 A1* 6/2008 Osminer .................. G06F 8/73
717/140

* cited by examiner

*Primary Examiner* — Timothy A Mudrick
(74) *Attorney, Agent, or Firm* — Schwegman Lundberg & Woessner, P.A.

(57) ABSTRACT

Disclosed are systems, methods, and non-transitory computer-readable media for a self-learning and self-healing API platform. The API platform receives messages transmitted between computing systems according to an API designed to facilitate communications between the computing systems. The API includes a message sequence and schema for communications between the computing systems. If the API platform detects an occurrence of a modification trigger associated with the API, the API platform determines a modification to be performed to the API. The modification includes a change to the message sequence and schema of the API. The API platform automatically executes the modification, resulting in a revised API. Accordingly, subsequent messages transmitted between the computing systems are transmitted according to the revised API.

20 Claims, 6 Drawing Sheets

APPLICATION PROGRAMMING INTERFACE (API) PLATFORM

TECHNICAL FIELD

An embodiment of the present subject flatter relates generally to application programming interfaces (APIs) and, more specifically, to a self-learning and self-healing API platform.

BACKGROUND

Software service providers may provide their clients with customized versions of their services based on a client's specific needs. For example, a software service provider may develop an API to allow for communication between the service provider's and the client's systems, as well as to provide the client with a specified interface, functionality, data, etc. Currently, this process is difficult and laborious. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for a self-learning and self-healing API platform. Currently, APIs are generated and updated manually by developers, which requires significant time and work. The API platform of the current disclosure alleviates current issues with API development by automating this process through self-learning and self-healing. The API platform leverages a variety of internal and/or external data sources, such as API implementation data from other systems, customer and/or industry best practices, etc., to self-learn and identify issues with an API. For example, the API platform uses this data to analyze the API and identify modifications to the API. For example, the API platform may leverage the data to determine that a certain parameter is government mandated, certain data is not a good payload, the payload should be extended to include one or more additional data fields, a certain timeout value should be used, etc.

The API platform self-heals the API by automatically implementing the modification to the API. For example, the API platform may implement the modification to the message sequence and schema of the API to create an updated version of the API. Examples of modifications that the API platform may automatically perform include modifying the timeout value, extending the payload to include additional data fields, modifying the message sequence, etc.

The API platform may perform the self-learning and self-healing process as part of a validation process. For example, the API platform may receive data describing a version of an API (e.g., initial or updated version) and validate whether there are any issues with the API that should be addressed, such as any needed modifications. The API platform may then automatically implement any identified modifications.

In another example, the API platform may perform the self-learning and self-healing process in response to detecting an error. For example, the API platform may monitor performance of messages transmitted using an API for any errors. In response to detecting an error, the API platform may determine a modification to the API to correct the error. For example, the API platform may use self-learning by leveraging the internal and/or external data sources to identify a modification based on the error. Alternatively, the API platform may have predetermined modifications associated with certain errors. For example, in response to an error such as a timeout, the API platform may utilize a predetermined formula to adjust the timeout value associated with the API. This process may be repeated until the timeout error no longer occurs or a frequency at which it occurs is within an allowable range.

The API platform uses an improved method to extend the payload of existing APIs. APIs use data tables to provide the data values included in an API payload. Currently, new tables are formulated for each new version of an API to extend its payload. This process is both repetitive and time consuming. The API platform alleviates this issue by linking the data table(s) used for a previous version of an API to a newly generated data table that includes the data values that are to be added to the payload. For example, the API platform adds a new row to the existing data table and includes a link to the new data table in the new row of the existing data table. This process may be repeated for each subsequent version of the API.

Figure 1:
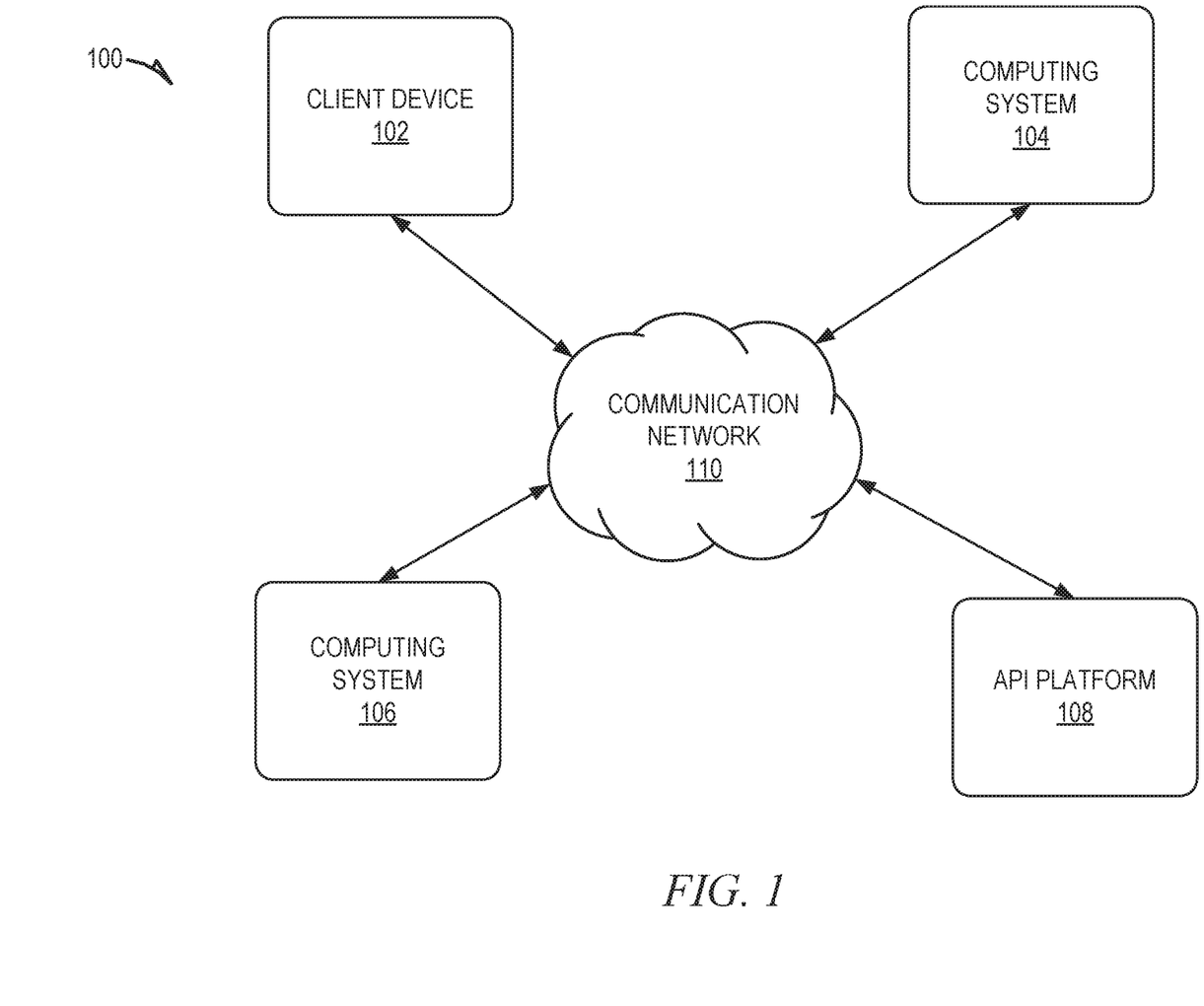
FIG. 1 shows a system wherein an API platform uses self-learning and self-healing to automatically update an API, according to some example embodiments.

FIG. 1 shows a system 100 wherein an API platform uses self-learning and self-healing to automatically update an API. As shown, multiple devices (i.e., a client device 102, a computing system 104, a computing system 106, and an API platform 108) are connected to a communication network 110 and configured to communicate with each other through use of the communication network 110. The communication network 110 is any type of network, including a local area network (LAN), such as an intranet, a wide area network (WAN), such as the Internet, or any combination thereof. Further, the communication network 110 may be a public network, a private network; or a combination thereof. The communication network 110 is implemented using any number of communications links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, a smart phone, or a tablet personal computer (PC). A computing device can include some or all of the features, components, and peripherals of the computing system 600 shown in FIG. 6.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the API platform 108 using the client device 102 that is connected to the communication network 110 by direct and/or indirect communication. Although the shown system 100 includes only one client device 102, this is only for ease of explanation and is not meant to be limiting. One skilled in the art would appreciate that the system 100 can include any number of client devices 102. Further, the API platform 108 may concurrently accept connections from and interact with any number of client devices 102. The API platform 108 supports connections from a variety of different types of client devices 102, such as desktop computers; mobile computers; mobile communications devices, e.g., mobile phones, smart phones, and tablets; smart televisions; set-top boxes; and/or any other network-enabled computing devices. Hence, the client device 102 may be of varying type, capabilities, operating systems, and so forth.

A user interacts with the API platform 108 via a client-side application installed on the client device 102. In some embodiments, the client-side application includes a component specific to the API platform 108. For example; the component may be a standalone application, one or more application plug-ins, and/or a browser extension. However, the users may also interact with the API platform 108 via a third-party application, such as a web browser, that resides on the client device 102 and is configured to communicate with the API platform 108, In either case, the client-side application presents a user interface (UI) for the user to interact with the API platform 108. For example, the user interacts with the API platform 108 via a client-side application integrated with the file system or via a webpage displayed using a web browser application.

The API platform 108 is one or more computing devices configured to facilitate API messaging between two computing systems (e.g., the computing system 104 and the computing system 106). For example, the API platform 108 may provide API messaging to enable a client computing system (e.g., the computing system 104) to utilize the functionality of a software service provider computing system (e.g., the computing system 106). Software service providers may provide their clients with customized versions of their services through use of customized APIs. The API platform 108 facilitates communications between the client and service provider computing systems via the provided API. For example, the client computing system 104 transmits API messages based on the provided API, which are received by the API platform 108. The API platform 108 then forwards the received API messages to the service provider computing system 106. Likewise, the service provider computing system 106 may transmit API messages to the client computing system 104 in a similar manner.

An API includes a message sequence and schema for API messages transmitted between the computing systems 104, 106. For example, the message sequence and schema dictates the order in which API messages are transmitted between the computing systems 104, 106, the format of the API messages, the payload of the API messages, etc. The message sequence and schema may also include schema values that define performance of the API. For example, a schema value may include a timeout value to be used for one or more of the API messages. The timeout value indicates an amount of time that the API platform 108 should wait for a reply to an API message. If a response is not received within the amount of time, the API platform 108 returns a timeout error in response to the API message.

The API platform 108 enables developers to generate and implement an API for a client. That is, a developer may use their client device 102 to access a user interface provided by the API platform 108 to develop and/or implement an API for a client.

Currently, APIs are generated and updated manually by developers, which requires significant time and work. The API platform 108 of the current disclosure alleviates current issues with API development by automating a portion of this process through self-learning and self-healing. The API platform 108 leverages a variety of internal and/or external data sources, such as API implementation data from other systems, customer and/or industry best practices, etc., to self-learn and identify issues with an API. For example, the API platform 108 uses this data to analyze the API and identify modifications to the API. For example, the API platform 108 may leverage the data to determine that a certain parameter is government mandated, certain data is not a good payload, the payload should be extended to include one or more additional data fields, a certain timeout value should be used, etc.

The API platform 108 self-heals the API by automatically implementing the modification to the API. For example, the API platform 108 may implement the modification to the message sequence and schema of the API to create an updated version of the API. Examples of modifications that the API platform 108 may automatically perform include modifying the timeout value, extending the payload to include additional data fields, modifying the message sequence, etc.

The API platform 108 may perform the self-learning and self-healing process as part of a validation process. For example, the API platform 108 may receive data describing a version of an API (e.g., initial or updated version) and validate whether there are any issues with the API that should be addressed, such as any needed modifications. The API platform 108 may then automatically implement any identified modifications.

In another example, the API platform 108 may perform the self-learning and self-healing process in response to detecting an error. For example, the API platform 108 may monitor performance of messages transmitted using an API for any errors. In response to detecting an error, the API platform 108 may determine a modification to the API to correct the error. For example, the API platform 108 may, use self-learning by leveraging the internal and/or external data sources to identify a modification based on the error. Alternatively, the API platform 108 may have predetermined modifications associated with certain errors. For example, in response to an error such as a timeout, the API platform 108 may utilize a predetermined formula to adjust the timeout value associated with the API. This process may be repeated until the timeout error no longer occurs or a frequency at which it occurs is within an allowable range.

The API platform 108 uses an improved method to extend the payload of existing APIs. APIs use data tables to provide the data values included in an API payload. Currently, new tables are formulated for each new version of an API to extend its payload. This process is both repetitive and time consuming. The API platform 108 alleviates this issue by linking the data table(s) used for a previous version of an API to a newly generated data table that includes the data values that are to be added to the payload. For example, the API platform 108 adds a new row to the existing data table and includes a link to the new data table in the new row of the existing data table. This process may be repeated for each subsequent version of the API.

Figure 2:
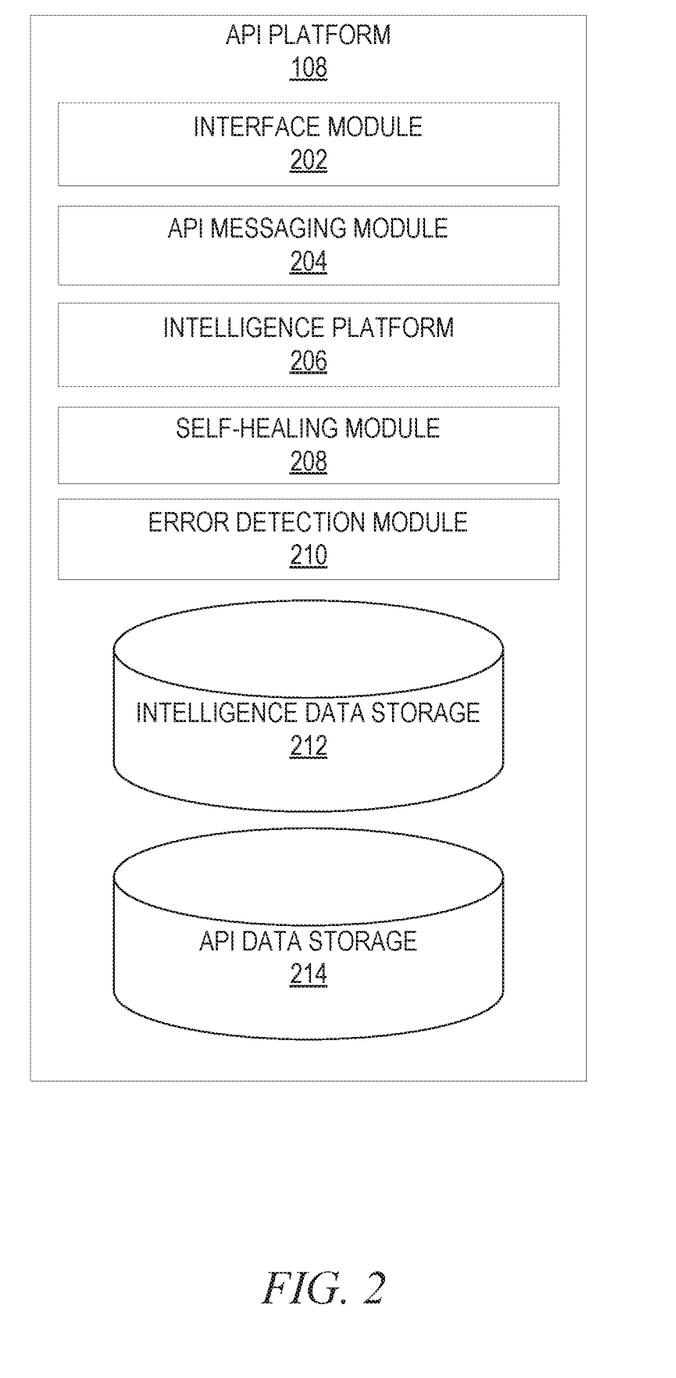
FIG. 2 is a block diagram of the API platform, according to some example embodiments.

FIG. 2 is a block diagram of the API platform 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the API platform 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the API platform 108 includes an interface module 202, an API messaging module 204, an intelligence platform 206, a self-healing module 208, an error detection module 210, an intelligence data storage 212, and an API data storage 214.

The interface module 202 provides a development interface that enables developers to utilize the functionality of the API platform 108 to develop an API for a specified client. For example, the development interface includes user interface elements (e.g., text fields, buttons, etc.) that enable a developer to use their client device 102 to provide data associated with the API, such as identifying the computing systems 104, 106, selecting a protocol, defining the message sequences, establishing the API schema (e.g., message payloads, schema variables, etc.), generating business logic, etc. The interface module 202 may provide developers with a selection of template APIs that the developer may choose from to use when developing a customized API for a client. For example, the API data storage 214 maintains a selection of existing base APIs, including message sequences and schemas, which a developer may select and modify according to a given client's need.

The development interface may also enable the developer to submit an API for verification and automatic modification using the intelligence platform 206 and self-healing module 208. The functionality of these modules is discussed in greater detail below.

The API messaging module 204 facilitates communication between computing systems 104, 106 using a provided API. For example, the API messaging module 204 receives API messages from each of the computing systems 104 and 106 and forwards the API messages along to the other computing system 104, 106. The messages are transmitted using the API's defined message sequence and schema.

The intelligence platform 206 leverages a variety of internal and/or external data sources, such as API implementation data from other systems, customer and/or industry best practices, etc., to self-learn and identify issues with an API. API implementation data includes data describing APIs implemented by other systems, such as data describing the specifics of the API, such as data describing the communicating computing systems 104, 106 (e.g., system types, geographic location, resource availability, etc.), the API message sequences (e.g., order of messages, number of messages, etc.), API schemas (e.g., message payloads, schema variables, etc.), etc. The API implementation data may also include data describing each version of the APIs as well as performance records of each API. The performance records describe API messages transmitted using the API, including data indicating the times when the API messages were transmitted and received, the source device, the destination device, whether errors were detected, etc.

In addition to the API implementation data, the intelligence platform 206 also utilizes data describing customer and/or industry best practices. The best practice data describes best practices when implementing an API. This can be specific to geographic regions, data type, industry, time, etc.

The data available to the intelligence platform 206 (e.g., API implementation data, customer and/or industry best practices, etc. is stored in the intelligence data storage 212. The intelligence platform 206 communicates with the intelligence data storage 212 to access the stored data. Although the intelligence data storage 212 is shown as a single entity, this is just for ease of explanation. The intelligence data storage 212 may comprise multiple databases, including databases that are local to the API platform 108, as well as remote databases, such as third-party databases. The intelligence platform 206 may access each of these databases separately to access the above described data.

The intelligence platform 206 uses the above described data to analyze a given API and determine modifications to the API. For example, the intelligence platform 206 may execute a validation process in which the intelligence platform 206 receives data describing the API. The data describing the API may include the API itself and/or specification data describing the desired functionality of the API, such as data describing the communicating computing systems, message sequence, payloads, geographic regions, etc. The intelligence platform 206 uses the provided data to analyze the data stored in the intelligence data storage 212 to identify any issues with the API. For example, the intelligence platform 206 may determine whether there are any issues with the selected payload, such as requirements of other data, government-mandated parameters, etc. As another example, the intelligence platform 206 may determine schema variable times, message sequences, etc., based on an analysis of other similar APIs or environments.

The intelligence platform 206 determines any modifications to be performed based on the analysis of the data stored in the intelligence data storage 212. For example, if the intelligence platform 206 determines that there is a government-mandated parameter that is not included, the intelligence platform 206 may determine a modification to the API schema to add the parameter to the payload of the API. As another example, if the intelligence platform 206 determines that the timeout value for messages is too short given the geographic location and/or network conditions of the computing system 104, 106, the intelligence platform 206 may suggest an updated timeout value that is suitable given the conditions.

The intelligence platform 206 provides data describing the modifications to the self-healing module 208, which in turn generates an updated version of the API based on the modifications. For example, the self-healing module 208 modifies the message sequence and/or schema of the API, which results in the updated version of the API. The self-healing module 208 stores the updated version of the API in the API data storage 214.

The self-healing module 208 uses an improved method to extend the payload of existing APIs. APIs rely on data tables to store the data values included in an API payload. Currently, new tables are formulated for each new version of an API to extend its payload. This process is both repetitive and time consuming. The self-healing module 208 alleviates this issue by linking the data table(s) used for a previous version of an API to a newly generated data table that includes the data values that are to be added to the payload. For example, the self-healing module 208 adds a new row to the most recent existing data table and includes a link in the new row which points to the newly generated data table. The self-healing module 208 may repeat this process for each subsequent version of the API, which allows the self-healing module 208 to easily generate and implement new versions of an API.

In addition to the verification process discussed earlier, the API platform 108 may also perform the self-learning and self-healing process in response to detecting an error. For example, the error detection module 210 monitors performance of API messages transmitted using an API and determines whether any errors occurred. For example, an error may occur as a result of a timeout, bad payload data, etc. In response to detecting an error, the error detection module 210 may provide data describing the detected error to the intelligence platform 206. The intelligence platform 206 uses the data to determine a modification to the API to correct the error. For example, the intelligence platform 206 may use self-learning by leveraging the internal and/or external data sources to identify a modification based on the error. Alternatively, the self-healing module 208 may have predetermined modifications associated with certain errors. For example, the error detection module 210 may provide the self-healing module 208 with data describing a detected error. In response, the self-healing module 208 identifies predetermined logic and/or algorithms to modify the API in response to the error. For example, in response to an error such as a timeout, the self-healing module 208 may utilize a predetermined formula to adjust the timeout value associated with the API. This process may be repeated until the timeout error no longer occurs or a frequency at which it occurs is within an allowable range.

Figure 3:
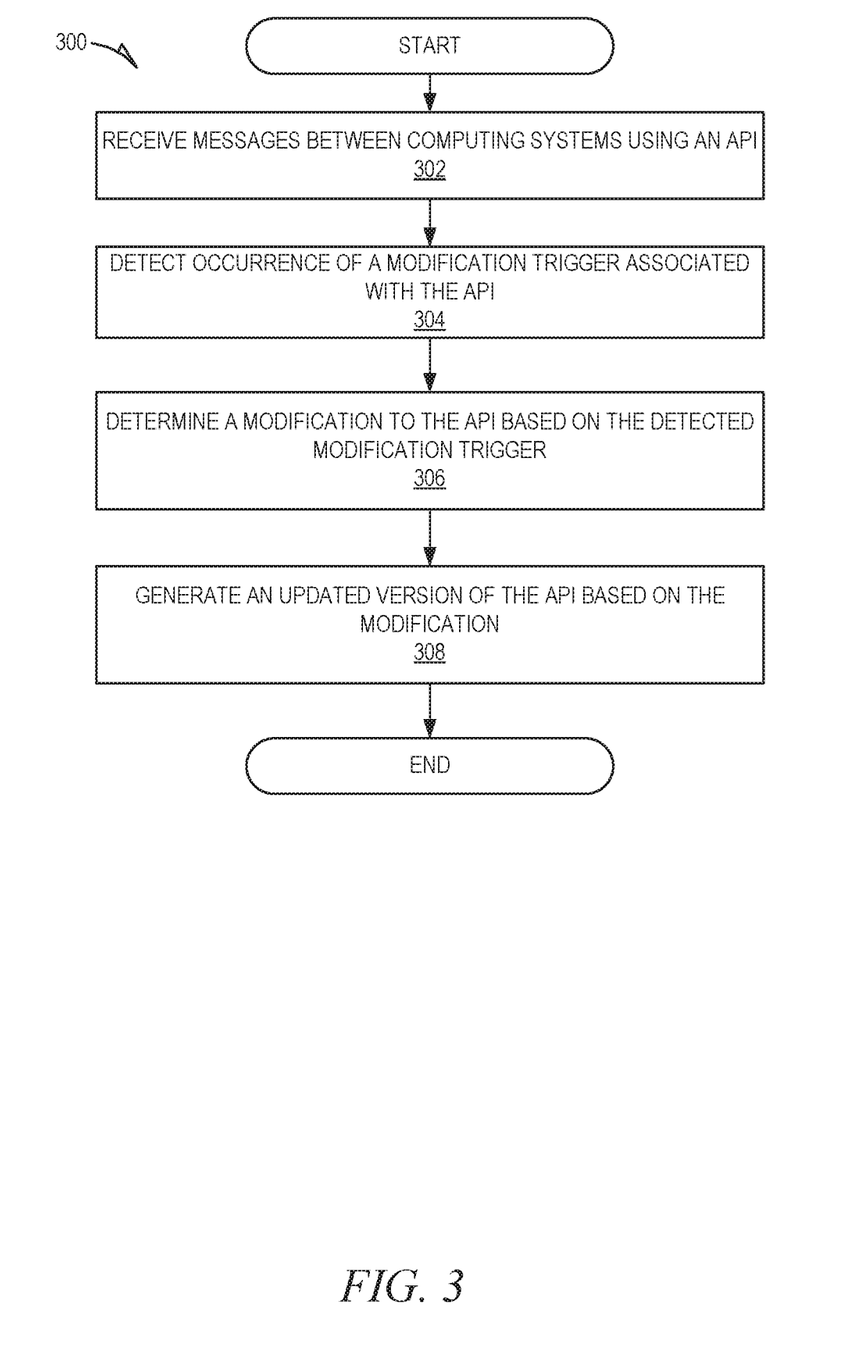
FIG. 3 is a flowchart showing an example method of self-healing an API, according to certain example embodiments.

FIG. 3 is a flowchart showing an example method 300 of self-healing an API, according to certain example embodiments. The method 300 may be embodied in computer-readable instructions for execution by one or more processors such that the operations of the method 300 may be performed in part or in whole by the API platform 108; accordingly, the method 300 is described below by way of example with reference thereto. However, it shall be appreciated that at least some of the operations of the method 300 may be deployed on various other hardware configurations and the method 300 is not intended to be limited to the API platform 108.

At operation 302, the API messaging module 204 receives messages transmitted between computing systems using an API. The API messaging module 204 facilitates communication between computing systems 104, 106 using a provided API. For example, the API messaging module 204 receives API messages from each of the computing systems 104 and 106 and forwards the API messages along to the other computing system 104, 106. The messages are transmitted using the API's defined message sequence and schema.

At operation 304, the API platform 108 detects occurrence of a modification trigger associated with the API. A modification trigger may be an occurrence of an error detected while transmitting messages. For example, the error detection module 210 may detect an error. As another example, the modification trigger may be a user selecting to modify the API in a desired way. As another example, the modification trigger may be a determination that the API should be modified based on gathered intelligence. For example, the intelligence platform 206 may determine based on data available to the intelligence platform 206 that the API should be modified to adjust for new developments, such as changing network availability, server geographic region, etc.

At operation 306, the API platform 108 determines a modification to the API based on the detected modification trigger. In some embodiments, the intelligence platform 206 determines the modification. The intelligence platform 206 leverages a variety of internal and/or external data sources, such as API implementation data from other systems, customer and/or industry best practices, etc., to self-learn and identify issues with an API. API implementation data includes data describing APIs implemented by other systems, such as data describing the specifics of the API, such as data describing the communicating computing systems 104, 106 (e.g., system types, geographic location, resource availability, etc.), the API message sequences (e.g., order of messages, number of messages, etc.), API schemas (e.g., message payloads, schema variables, etc.), etc. The API implementation data may also include data describing each version of the APIs as well as performance records of each API. The performance records describe API messages transmitted using the API, including data indicating the times when the API messages were transmitted and received, the source device, the destination device, whether errors were detected, etc.

In addition to the API implementation data, the intelligence platform 206 also utilizes data describing customer and/or industry best practices. The best practice data describes best practices when implementing an API. This can be specific to geographic regions, data type, industry, time; etc.

The data available to the intelligence platform 206 (e.g., API implementation data, customer and/or industry best practices, etc.) is stored in the intelligence data storage 212. The intelligence platform 206 communicates with the intelligence data storage 212 to access the stored data. Although the intelligence data storage 212 is shown as a single entity, this is just for ease of explanation. The intelligence data storage 212 may comprise multiple databases, including databases that are local to the API platform 108, as well as remote databases; such as third-party databases. The intelligence platform 206 may access each of these databases separately to access the above described data.

The intelligence platform 206 uses the above described data to analyze a given API and determine modifications to the API. For example, the intelligence platform 206 may execute a validation process in which the intelligence platform 206 receives data describing the API. The data describing the API may include the API itself and/or specification data describing the desired functionality of the API, such as data describing the communicating computing systems, message sequence, payloads, geographic regions, etc. The intelligence platform 206 uses the provided data to analyze the data stored in the intelligence data storage 212 to identify any issues with the API. For example, the intelligence platform 206 may determine whether there are any issues with the selected payload, such as requirements of other data, government-mandated parameters, etc. As another example, the intelligence platform 206 may determine schema variable times, message sequences, etc., based on an analysis of other similar APIs or environments.

The intelligence platform 206 determines any modifications to be performed based on the analysis of the data stored in the intelligence data storage 212. For example, if the intelligence platform 206 determines that there is a government-mandated parameter that is not included, the intelligence platform 206 may determine a modification to the API schema to add the parameter to the payload of the API. As another example, if the intelligence platform 206 determines that the timeout value for messages is too short given the geographic location and/or network conditions of the computing system 104, 106, the intelligence platform 206 may suggest an updated timeout value that is suitable given the conditions.

In some embodiments, the self-healing module 208 determines the modification to the API. For example, in response to detecting a modification trigger, the self-healing module 208 uses data describing a detected error to identify predetermined logic and/or algorithms to modify the API in response to the error. For example, in response to an error such as a timeout, the self-healing module 208 may utilize a predetermined formula to adjust the timeout value associated with the API. This process may be repeated until the timeout error no longer occurs or a frequency at which it occurs is within an allowable range At operation 308, the self-healing module 208 generates an updated version of the API based on the modification. For example, the self-healing module 208 modifies the message sequence and/or schema of the API, which results in the updated version of the API. The self-healing module 208 stores the updated version of the API in the API data storage 214.

The self-healing module 208 uses an improved method to extend the payload of existing APIs. APIs rely on data tables to store the data values included in an API payload. Currently, new tables are formulated for each new version of an API to extend its payload. This process is both repetitive and time consuming. The self-healing module 208 alleviates this issue by linking the data table(s) used for a previous version of an API to a newly generated data table that includes the data values that are to be added to the payload. For example, the self-healing module 208 adds a new row to the most recent existing data table and includes a link in the new row which points to the newly generated data table. The self-healing module 208 may repeat this process for each subsequent version of the API, which allows the self-healing module 208 to easily generate and implement new versions of an API.

Figure 4:
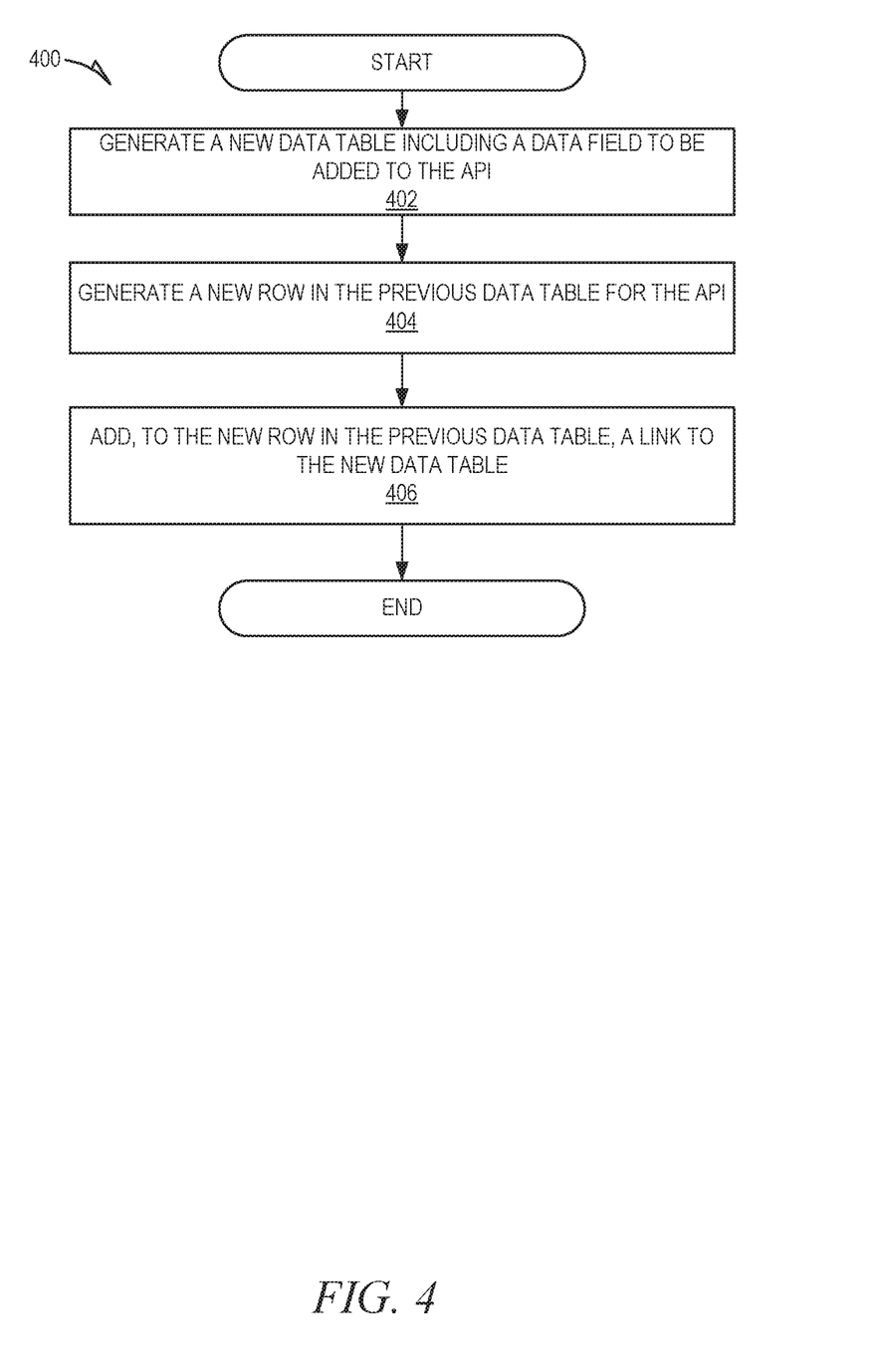
FIG. 4 is a flowchart showing an example method of extending an API, according to certain example embodiments.

FIG. 4 is a flowchart showing an example method 400 of extending an API, according to certain example embodiments. The method 400 may be embodied in computer-readable instructions for execution by one or more processors such that the operations of the method 400 may be performed in part or in whole by the API platform 108; accordingly, the method 400 is described below by way of example with reference thereto. However, it shall be appreciated that at least some of the operations of the method 400 may be deployed on various other hardware configurations and the method 400 is not intended to be limited to the API platform 108.

At operation 402, the self-healing module 208 generates a new data table including a data field to be added to the API. For example, the new data table includes a separate row for each new data field to be added to the API.

At operation 404, the self-healing module 208 generates a new row in the previous data table for the API. The previous data table is the most recently generated data table for the API. For example, if only a single version of the API has been created, then the new row is added to the data table used for the initial version of the API. Alternatively, if the API has been previously extended to create a new version, the new row is added to the most recently added data table for the API. The new row is added to the bottom of the previous data table.

At operation 406, the self-healing module 208 adds, to the new row in the previous data table, a link to the new data table. For example, the self-healing module 208 adds a new type of value to the new row that points or links to the first row in the newly generated data table. Accordingly, the API will be extended to include the new data fields included in the new data table. This is in addition to the data fields included in the previous versions of the API.

Figure 5:
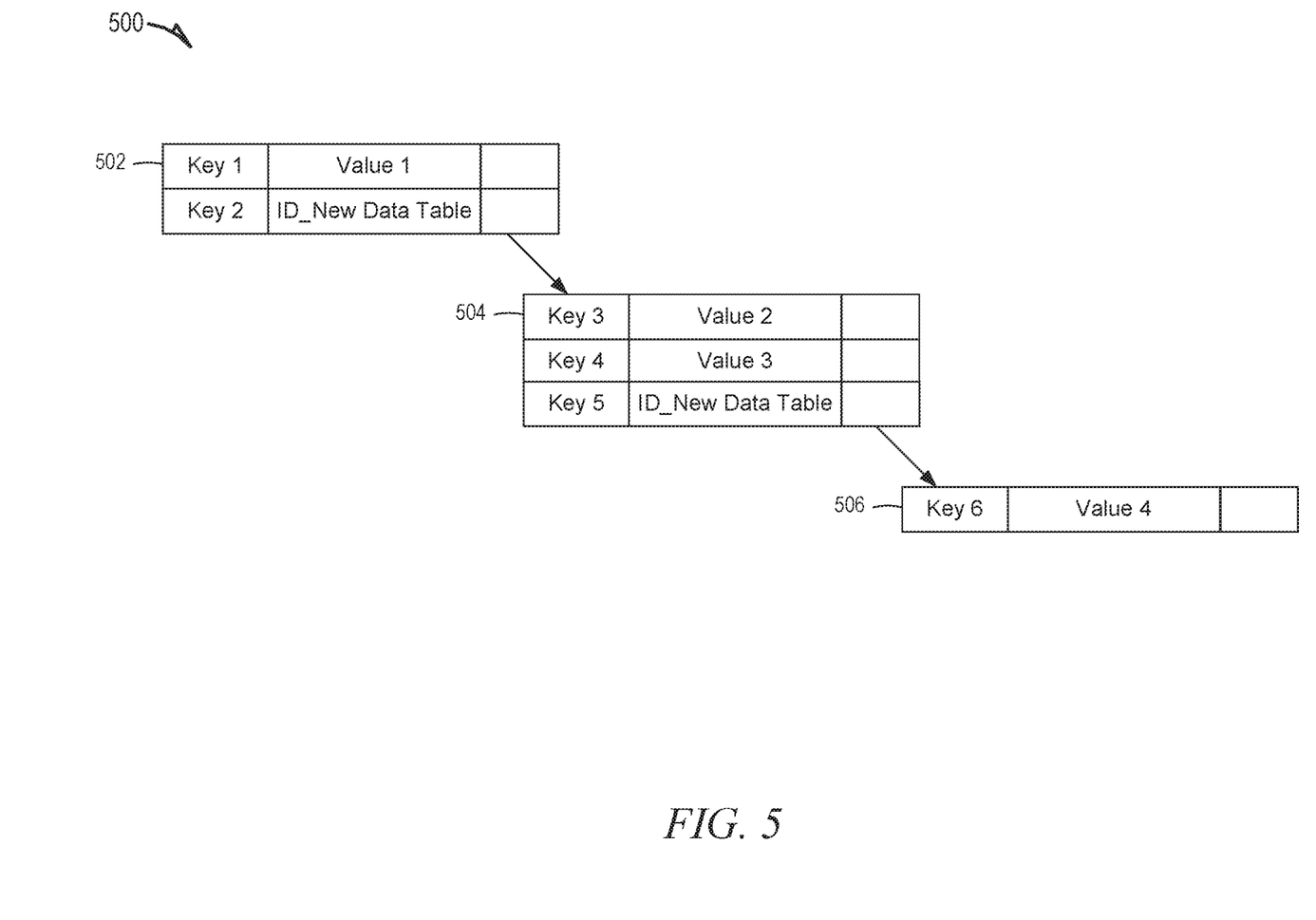
FIG. 5 shows an example database model that includes linked data tables to extend an API, according to some example embodiments.

FIG. 5 shows an example database model 500 that includes linked data tables to extend an API, according to some example embodiments. As shown, the database model 500 includes three data tables 502, 504, and 506. Each data table 502, 504, and 506 corresponds to a version of an API and includes data values that are included in the payload of the API. For example, the first data table 502 includes data values that were included in the first version of the API, the second data table 504 includes data values that were added for inclusion in the second version of the API, and the third data table 506 includes data values that were added for inclusion in the third version of the API. Accordingly, the second version of the API includes the data values in both the first data table 502 and the second data table 504, while the third version of the API includes the data values in the first data table 502, second data table 504, and third data table 506.

As shown, each data table 502, 504, and 506 includes rows storing the data values to be included in the payload of the API. To generate a new version of the API that extends the payload, an existing data table is linked to a new data table that includes the data values to be added to the payload of the API. For example, as shown, the last row of the first data table 502 includes a link to the first row of the second data table 504. Likewise, the last row of the second data table 504 includes a link to the first row of the third data table 506. Linking data tables in this manner allows for the payload of the API to be easily extended by using the previously created data tables along with a new data table that includes the data values to be added. In contrast, current techniques involve creating a completely new data table that includes all of the data values to be used in the new version of the API.

Examples

Example 1 is a method comprising: receiving, by an application programming interface (API) platform, messages transmitted between a first computing system and a second computing system, the messages being transmitted according to a first API designed to facilitate communications between the first computing system and the second computing system, the first API including a message sequence and schema for communications between the first computing system and the second computing system; detecting, by the API platform, occurrence of a modification trigger associated with the first API; determining, based on the modification trigger, a first modification to be performed to the first API, the first modification causing a change to the message sequence and schema of the first API; and automatically executing the first modification, yielding a revised first API, wherein subsequent messages transmitted between the first computing system and the second computing system are transmitted according to the revised first API.

In Example 2, the subject matter of Example 1 optionally includes wherein the modification trigger is an error associated with transmission of a first message between the first computing system and the second computing system.

In Example 3, the subject matter of Example 1 or Example 2 optionally includes wherein determining the first modification to be performed to the first API comprises: identifying, based on the error, a predetermined adjustment to a first schema value included in the message sequence and schema of the first API, the predetermined adjustment to the first schema value being executed as part of the first modification.

In Example 4, the subject matter of Examples 1 to 3 optionally includes wherein the first schema value is a timeout value.

In Example 5, the subject matter of Examples 1 to 4 optionally includes wherein the modification trigger is a determination that a first API message defined by the first API should be extended to include an additional data field.

In Example 6, the subject matter of Examples 1 to 5 optionally includes wherein executing the first modification comprises: adding a new row to a first data table associated with the first API message in the message sequence and schema of the first API, the new row including a link to a second data table that is different than the first data table, the second data table including the additional data field.

In Example 7, the subject matter of Examples 1 to 6 optionally includes validating that the additional data field can be added to the first API based on data describing APIs implemented by a plurality of external systems.

Example 8 is an application programming interface (APO platform comprising: one or more computer processors; and one or more computer-readable mediums storing instructions that, when executed by the one or more computer processors, cause the API platform to perform operations comprising: receiving messages transmitted between a first computing system and a second computing system, the messages being transmitted according to a first API designed to facilitate communications between the first computing system and the second computing system, the first API including a message sequence and schema for communications between the first computing system and the second computing system; detecting, by the API platform, occurrence of a modification trigger associated with the first API; determining, based on the modification trigger, a first modification to be performed to the first API, the first modification causing a change to the message sequence and schema of the first API; and automatically executing the first modification, yielding a revised first API, wherein subsequent messages transmitted between the first computing system and the second computing system are transmitted according to the revised first API.

In Example 9, the subject matter of Example 8 optionally includes wherein the modification trigger is an error associated with transmission of a first message between the first computing system and the second computing system.

In Example 10, the subject matter of Example 8 or Example 9 optionally includes wherein determining the first modification to be performed to the first API comprises: identifying, based on the error, a predetermined adjustment to a first schema value included in the message sequence and schema of the first API, the predetermined adjustment to the first schema value being executed as part of the first modification.

In Example 11, the subject matter of Examples 8 to 10 optionally includes wherein the first schema value is a timeout value.

In Examiner 12, the subject matter of Examples 8 to 11 optionally includes wherein the modification trigger is a determination that a first API message defined by the first API should be extended to include an additional data field.

In Example 13, the subject matter of Examples 8 to 12 optionally includes wherein executing the first modification comprises: adding a new row to a first data table associated with the first API message in the message sequence and schema of the first API, the new row including a link to a second data table that is different than the first data table, the second data table including the additional data field.

In Example 14, the subject matter of Examples 8 to 13 optionally includes validating that the additional data field can be added to the first API based on data describing APIs implemented by a plurality of external systems.

Example 15 is a non-transitory computer-readable medium storing instructions that, when executed by one or more computer processors of an application programming interface (API) platform, cause the API platform to perform operations comprising: receiving messages transmitted between a first computing system and a second computing system, the messages being transmitted according to a first API designed to facilitate communications between the first computing system and the second computing system, the first API including a message sequence and schema for communications between the first computing system and the second computing system; detecting, by the API platform, occurrence of a modification trigger associated with the first API; determining, based on the modification trigger, a first modification to be performed to the first API, the first modification causing a change to the message sequence and schema of the first API; and automatically executing the first modification, yielding a revised first API, wherein subsequent messages transmitted between the first computing system and the second computing system are transmitted according to the revised first API.

In Example 16, the subject matter of Example 15 optionally includes wherein the modification trigger is an error associated with transmission of a first message between the first computing system and the second computing system.

In Example 17, the subject matter of Example 15 or Example 16 optionally includes identifying, based on the error, a predetermined adjustment to a first schema value included in the message sequence and schema of the first API, the predetermined adjustment to the first schema value being executed as part of the first modification, wherein the first schema value is a timeout value.

In Example 18, the subject matter of Examples 15 to 17 optionally includes wherein the modification trigger is a determination that a first API message defined by the first API should be extended to include an additional data field.

In Example 19, the subject matter of Examples 15 to 18 optionally includes wherein executing the first modification comprises: adding a new row to a first data table associated with the first API message in the message sequence and schema of the first API, the new row including a link to a second data table that is different than the first data table; the second data table including the additional data field.

In Example 20, the subject matter of Examples 15 to 19 optionally includes validating that the additional data field can be added to the first API based on data describing APIs implemented by a plurality of external systems.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instant in time. For example, where the hardware modules comprise a general-purpose processor configured using software, the general-purpose processor may be configured as respective different hardware modules at different times. Software may accordingly configure a processor, for example, to constitute a particular hardware module at one instant of time and to constitute a different hardware module at a different instant of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 6:
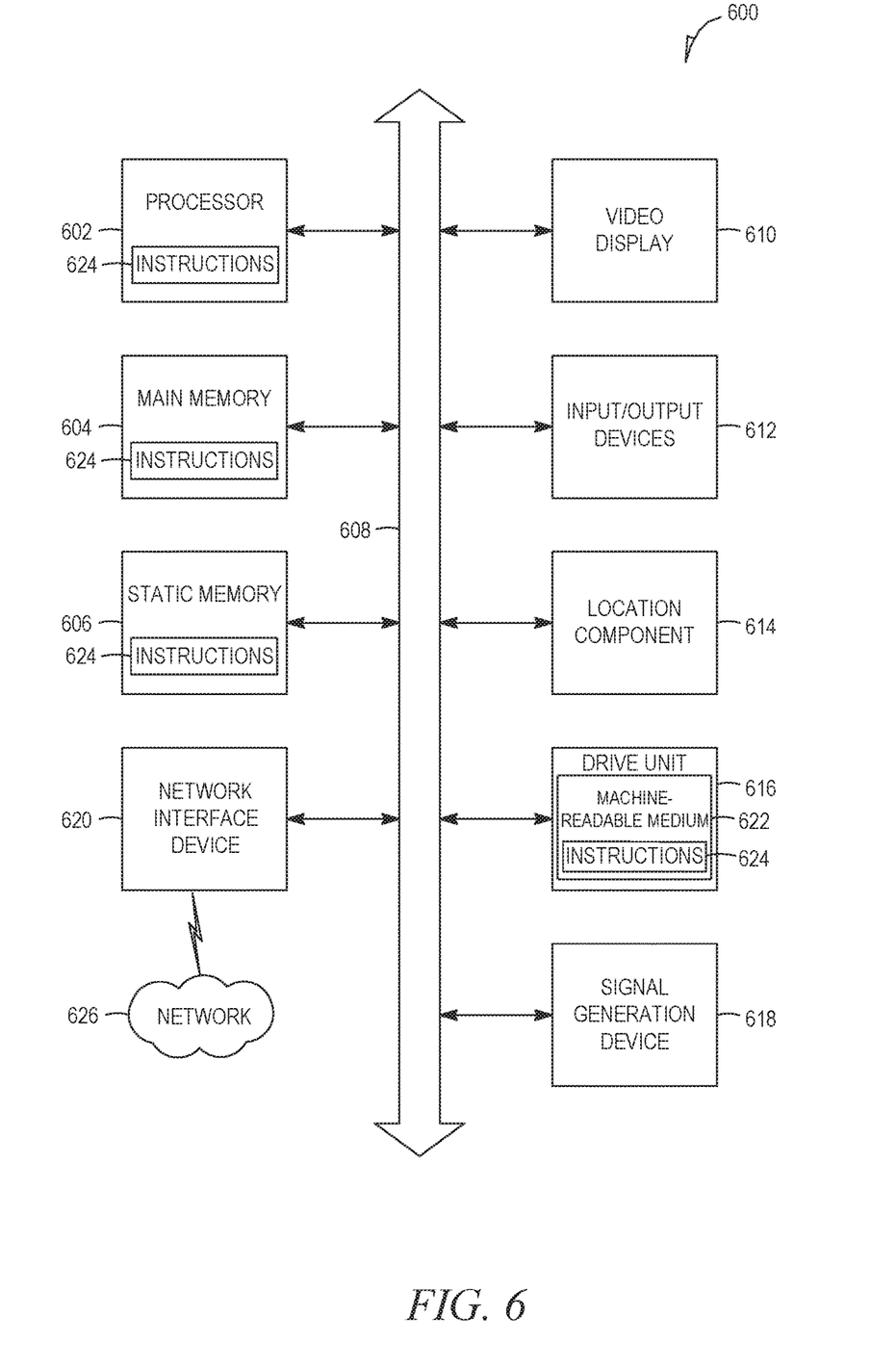
FIG. 6 is a diagrammatic representation of a machine in the example form of a computer system within which a set of instructions for causing the machine to perform any one or more of the methodologies discussed herein may be executed.

FIG. 6 is a diagrammatic representation of a machine in the example form of a computer system 600 within which a set of instructions for causing the machine to perform any one or more of the methodologies discussed herein may be executed. The computer system 600 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine may, for example, be a personal computer (PC), a personal digital assistant (PDA), a cellular telephone, a smart phone (e.g., iPhone®), a tablet computer, a web appliance, a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data-enabled book reader, a video game system console, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 may further include a video display 610 (e.g., a liquid crystal display (LCD) or a cathode ray tube (CRT)). The computer system 600 also includes one or more input/output (I/O) devices 612, a location component 614, a drive unit 616, a signal generation device 618 (e.g., a speaker), and a network interface device 620. The I/O devices 612 may, for example, include a keyboard, a mouse, a keypad, a multi-touch surface (e.g., a touchscreen or track pad), a microphone, a camera, and the like.

The location component 614 may be used for determining a location of the computer system 600. In some embodiments, the location component 614 may correspond to a GPS transceiver that may make use of the network interface device 620 to communicate GPS signals with a GPS satellite. The location component 614 may also be configured to determine a location of the computer system 600 by using an internet protocol (IP) address lookup or by triangulating a position based on nearby mobile communications towers. The location component 614 may be further configured to store a user-defined location in the main memory 604 or the static memory 606. In some embodiments, a mobile location-enabled application may work in conjunction with the location component 614 and the network interface device 620 to transmit the location of the computer system 600 to an application server or third-party server for the purpose of identifying the location of a user operating the computer system 600.

In some embodiments, the network interface device 620 may correspond to a transceiver and antenna. The transceiver may be configured to both transmit and receive cellular network signals, wireless data signals, or other types of signals via the antenna, depending on the nature of the computer system 600.

Machine-Readable Medium

The drive unit 616 includes a machine-readable medium 622 on which is stored one or more sets of data structures and instructions 624 (e.g., software) embodying or used by any one or more of the methodologies or functions described herein. The instructions 624 may also reside, completely or at least partially, within the main memory 604, the static memory 606, and/or the processor 602 during execution thereof by the computer system 600, with the main memory 604, the static memory 606, and the processor 602 also constituting machine-readable media.

Consistent with some embodiments, the instructions 624 may relate to the operations of an operating system (OS). Depending on the particular type of the computer system 600, the OS may, for example, be the iOS® operating system, the Android® operating system, a BlackBerry® operating system, the Microsoft® Windows® Phone operating system, Symbian® OS, or webOS®, Further, the instructions 624 may relate to operations performed by applications (commonly known as "apps"), consistent with some embodiments. One example of such an application is a mobile browser application that displays content, such as a web page or a user interface using a browser.

While the machine-readable medium 622 is shown in an example embodiment to be a single medium, the term "machine-readable medium" may include a single medium or multiple media (e.g., a centralized or distributed database, and/or associated caches and servers) that store the one or more data structures or instructions 624. The term "machine-readable medium" shall also be taken to include any tangible medium that is capable of storing; encoding; or carrying instructions (e.g., the instructions 624) for execution by the machine and that cause the machine to perform any one or more of the methodologies of the present disclosure, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 624 may further be transmitted or received over a network 626 using a transmission medium. The instructions 624 may be transmitted using the network interface device 620 and any one of a number of well-known transfer protocols (e.g., HTTP). Examples of communication networks include a LAN; a WAN, the Internet, mobile telephone networks, plain old telephone service (POTS) networks, and wireless data networks (e.g., WiFi and WiMax networks). The term "transmission medium" shall be taken to include any intangible medium that is capable of storing, encoding, or carrying the instructions 624 for execution by the machine, and includes digital or analog communications signals or other intangible media to facilitate communication of such software.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   receiving, by an application programming interface (API) platform, messages transmitted between a first computing system and a second computing system, the messages being transmitted according to a first API that is associated with a modification trigger and defines a message sequence and schema for communications;
   detecting, by the API platform, occurrence of the modification trigger associated with the first API;
   determining, based on the detected occurrence of the modification trigger, a first modification to be performed on the first API, the first modification defining a change to the message sequence and schema of the first API; and
   automatically performing the first modification on the first API, the performed first modification causing the change to the message sequence and schema of the first API and yielding a revised first API, wherein subsequent messages transmitted between the first computing system and the second computing system are transmitted according to the revised first API.

2. The method of claim 1, wherein the modification trigger is an error associated with transmission of a first message between the first computing system and the second computing system.

3. The method of claim 2, wherein determining the first modification to be performed to the first API comprises:
   identifying, based on the error, a predetermined adjustment to a first schema value included in the message sequence and schema of the first API, the predetermined adjustment to the first schema value being executed as part of the first modification.

4. The method of claim 3, wherein the first schema value is a timeout value.

5. The method of claim 1, wherein the modification trigger is a determination that a first API message defined by the first API should be extended to include an additional data field.

6. The method of claim 5, wherein the performing of the first modification comprises:
adding a new row to a first data table associated with the first API message in the message sequence and schema of the first API, the new row including a link to a second data table that is different than the first data table, the second data table including the additional data field.

7. The method of claim 5, further comprising:
validating that the additional data field can be added to the first API based on data describing APIs implemented by a plurality of external systems.

8. An system comprising:
one or more computer processors; and
one or more computer-readable mediums storing instructions that, when executed by the one or more computer processors, cause the system to perform operations comprising:
receiving messages transmitted between a first computing system and a second computing system, the messages being transmitted according to a first API that is associated with a modification trigger and defines a message sequence and schema for communications;
detecting occurrence of the modification trigger associated with the first API;
determining, based on the detected occurrence of the modification trigger, a first modification to be performed on the first API, the first modification defining a change to the message sequence and schema of the first API; and
automatically performing the first modification on the first API, the performed first modification causing the change to the message sequence and schema of the first API and yielding a revised first API, wherein subsequent messages transmitted between the first computing system and the second computing system are transmitted according to the revised first API.

9. The system of claim 8, wherein the modification trigger is an error associated with transmission of a first message between the first computing system and the second computing system.

10. The system of claim 9, wherein determining the first modification to be performed to the first API comprises:
identifying, based on the error, a predetermined adjustment to a first schema value included in the message sequence and schema of the first API, the predetermined adjustment to the first schema value being executed as part of the first modification.

11. The system of claim 10, wherein the first schema value is a timeout value.

12. The system of claim 8, wherein the modification trigger is a determination that a first API message defined by the first API should be extended to include an additional data field.

13. The system of claim 12, wherein the performing of the first modification comprises:
adding a new row to a first data table associated with the first API message in the message sequence and schema of the first API, the new row including a link to a second data table that is different than the first data table, the second data table including the additional data field.

14. The system of claim 12, the operations further comprising:
validating that the additional data field can be added to the first API based on data describing APIs implemented by a plurality of external systems.

15. A non-transitory computer-readable medium storing instructions that,
when executed by one or more computer processors of an application programming interface (API) platform, cause the API platform to perform operations comprising:
receiving messages transmitted between a first computing system and a second computing system, the messages being transmitted according to a first API that is associated with a modification trigger and defines a message sequence and schema for communications;
detecting occurrence of the modification trigger associated with the first API;
determining, based on the detected occurrence of the modification trigger, a first modification to be performed on the first API, the first modification defining a change to the message sequence and schema of the first API; and
automatically performing the first modification on the first API, the performed first modification causing the change to the message sequence and schema of the first API and yielding a revised first API, wherein subsequent messages transmitted between the first computing system and the second computing system are transmitted according to the revised first API.

16. The non-transitory computer-readable medium of claim 15, wherein the modification trigger is an error associated with transmission of a first message between the first computing system and the second computing system.

17. The non-transitory computer-readable medium of claim 16, wherein determining the first modification to be performed to the first API comprises:
identifying, based on the error, a predetermined adjustment to a first schema value included in the message sequence and schema of the first API, the predetermined adjustment to the first schema value being executed as part of the first modification, wherein the first schema value is a timeout value.

18. The non-transitory computer-readable medium of claim 15, wherein the modification trigger is a determination that a first API message defined by the first API should be extended to include an additional data field.

19. The non-transitory computer-readable medium of claim 18, wherein the performing of the first modification comprises:
adding a new row to a first data table associated with the first API message in the message sequence and schema of the first API, the new row including a link to a second data table that is different than the first data table, the second data table including the additional data field.

20. The non-transitory computer-readable medium of claim 18, the operations further comprising:
validating that the additional data field can be added to the first API based on data describing APIs implemented by a plurality of external systems.

* * * * *